United States Patent
He et al.

(10) Patent No.: US 10,671,403 B2
(45) Date of Patent: Jun. 2, 2020

(54) METHOD AND APPARATUS FOR IDENTIFYING HARDWARE DEVICE IN OPERATING SYSTEM

(71) Applicant: Lenovo (Beijing) Co., Ltd., Beijing (CN)

(72) Inventors: Haiyang He, Beijing (CN); Siyuan Wang, Beijing (CN); Aili Yao, Beijing (CN)

(73) Assignee: LENOVO (BEIJING) CO., LTD., Beijing (CN)

(*) Notice: Subject to any disclaimer, the term of this patent is extended or adjusted under 35 U.S.C. 154(b) by 157 days.

(21) Appl. No.: 15/899,936

(22) Filed: Feb. 20, 2018

(65) Prior Publication Data
US 2018/0239614 A1    Aug. 23, 2018

(30) Foreign Application Priority Data

Feb. 17, 2017 (CN) .......................... 2017 1 0085691
Mar. 6, 2017 (CN) .......................... 2017 1 0129761

(51) Int. Cl.
| | | |
|---|---|---|
| *G06F 9/00* | (2006.01) | |
| *G06F 9/24* | (2006.01) | |
| *G06F 15/177* | (2006.01) | |
| *G06F 9/4401* | (2018.01) | |
| *G06F 9/445* | (2018.01) | |
| *G06F 13/10* | (2006.01) | |

(52) U.S. Cl.
CPC .......... *G06F 9/4406* (2013.01); *G06F 9/4411* (2013.01); *G06F 9/44505* (2013.01); *G06F 13/10* (2013.01)

(58) Field of Classification Search
None
See application file for complete search history.

(56) References Cited

U.S. PATENT DOCUMENTS 6,243,773 B1 *  6/2001  Mahalingam ............. G06F 1/20
                                                                    710/104
6,263,387 B1 *  7/2001  Chrabaszcz ......... G06F 13/4086
                                                                    709/220
6,311,236 B1   10/2001  Oeda et al.
(Continued)

FOREIGN PATENT DOCUMENTS

CN        101776984 A        7/2010
CN        101819547 A        9/2010
(Continued)

*Primary Examiner* — Nitin C Patel
(74) *Attorney, Agent, or Firm* — Anova Law Group, PLLC

(57) ABSTRACT

A method for identifying a hardware device in an operating system and a computer apparatus are provided. The method includes determining a unique index identifier of a hardware device, and establishing a mapping relationship between the unique index identifier and a device number of the hardware device. The method also includes obtaining the unique index identifier of the hardware device, in response to a status change of a hardware interface. Further, the method includes according to the mapping relationship, obtaining and allocating the device number to the hardware device to enable an access to the hardware device according to the device number of the hardware device.

12 Claims, 6 Drawing Sheets

(56) References Cited

U.S. PATENT DOCUMENTS

| | | | | |
|---|---|---|---|---|
| 8,463,951 B1* | 6/2013 | Priem | .................... | G06F 9/4411 |
| | | | | 710/10 |
| 8,713,243 B2* | 4/2014 | Li | .......................... | G06F 3/0605 |
| | | | | 711/103 |
| 8,819,319 B2* | 8/2014 | Shirai | .................... | G06F 13/385 |
| | | | | 710/104 |
| 2002/0174330 A1* | 11/2002 | Cabrera | ................. | G06F 3/0607 |
| | | | | 713/100 |
| 2004/0064594 A1* | 4/2004 | Pooni | .................... | G06F 13/423 |
| | | | | 710/1 |
| 2004/0225764 A1* | 11/2004 | Pooni | .................... | G06F 13/423 |
| | | | | 710/38 |
| 2012/0137068 A1* | 5/2012 | Zeng | ..................... | G06F 3/0607 |
| | | | | 711/114 |
| 2014/0047133 A1* | 2/2014 | O'Connor | ............... | G06F 21/10 |
| | | | | 710/3 |
| 2014/0181502 A1* | 6/2014 | Lvovsky | ................ | G06F 9/4411 |
| | | | | 713/100 |
| 2014/0250320 A1* | 9/2014 | Nyuunoya | ........... | G06F 11/2092 |
| | | | | 714/4.11 |

FOREIGN PATENT DOCUMENTS

| | | |
|---|---|---|
| CN | 102467935 A | 5/2012 |
| CN | 102479163 A | 5/2012 |
| CN | 103744708 A | 4/2014 |
| CN | 104503701 A | 4/2015 |
| CN | 104679592 A | 6/2015 |
| CN | 105892950 A | 8/2016 |
| CN | 106021048 A | 10/2016 |
| DE | 10042823 A1 | 3/2002 |

\* cited by examiner

METHOD AND APPARATUS FOR IDENTIFYING HARDWARE DEVICE IN OPERATING SYSTEM

CROSS-REFERENCES TO RELATED APPLICATIONS

This application claims the priority of Chinese patent application Nos. 201710085691.3, filed on Feb. 17, 2017, and 201710129761.0, filed on Mar. 6, 2017, the entirety of all of which is incorporated herein by reference.

FIELD OF THE DISCLOSURE

The present disclosure generally relates to the field of numbering management of hardware device technology and, more particularly, relates to a method for identifying a hardware device in an operating system and a computer apparatus thereof.

BACKGROUND

A computer apparatus can provide one or more hardware interfaces for hardware devices to access. An operating system of the computer apparatus allocates device numbers to the hardware devices and identifies a corresponding hardware device based on the device number.

However, the operating system employs a dynamic allocation plan based on preemption principles for allocating the device numbers. Naming the hardware device with the first currently available device number can cause the device number of the hardware device to change before and after the reallocation. For example, in a case where a hardware interface used by the hardware device is changed, in other words, in a case where the hardware device is unplugged from one hardware interface of the computer apparatus and accessed to another hardware interface, based on the above dynamic allocation plan, the operating system may allocate different device numbers for the hardware device before and after the re-access.

Alternatively, even in a case where the hardware device doesn't change the used hardware interface, due to changes in the order in which the hardware device is loaded, the order in which the hardware device controller reports the hardware device to the operating system kernel, the scanning order of a peripheral component interconnect (PCI) bus, the order in which the hardware device controller is hot-swapped, or the order in which the hardware device is hot-swapped, etc., the device number allocated by the operating system for the hardware device may change, and thus, the device number of the hardware device may change before and after the reallocation.

In a case where the device number allocated by the operating system for the hardware device changes before and after the reallocation, the operating system cannot identify the hardware device using a fixed device number, making it extremely inconvenient to execute certain applications. For example, to execute a script program in the operating system, a device number of a hardware device is used in the script program. After the hardware device accesses to another different hardware interface, the device number in the script program needs to be manually modified to be the different allocated device number.

The disclosed method and computer apparatus are directed to solve one or more problems set forth above and other problems.

BRIEF SUMMARY OF THE DISCLOSURE

One aspect of the present disclosure includes a method for identifying a hardware device in an operating system. The method includes determining a unique index identifier of a hardware device, and establishing a mapping relationship between the unique index identifier and a device number of the hardware device. The method also includes obtaining the unique index identifier of the hardware device in response to a status change of a hardware interface. Further, the method includes according to the mapping relationship, obtaining and allocating the device number to the hardware device to enable an access to the hardware device according to the device number of the hardware device.

Another aspect of the present disclosure includes a computer apparatus. The computer apparatus includes a hardware interface, a memory, and a processor coupled with the hardware interface and the memory. The hardware interface provides an access for a hardware device. The memory stores computer-readable instructions. To execute the computer-readable instructions, through an operating system, the processor determines a unique index identifier of the hardware device, and establishes a mapping relationship between the unique index identifier and a device number of the hardware device. The processor also obtains the unique index identifier of the hardware device in response to a status change of a hardware interface. Further, according to the mapping relationship, the processor obtains and allocates the device number to the hardware device to enable an access to the hardware device according to the device number of the hardware device.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION

Reference will now be made in detail to various embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

The disclosed embodiments in the present disclosure are merely examples for illustrating the general principles of the disclosure. Any equivalent or modification thereof, without departing from the spirit and principle of the present disclosure, falls within the true scope of the present disclosure.

Moreover, in the present disclosure, the terms "include" and "contain" and their derivatives mean inclusion but not limitation. The term "or" is inclusive and means "and/or". The term "and/or" may be used to indicate that two associated objects may have three types of relations. For example, "A and/or B" may represent three situations: A exists, A and B coexist, and B exists.

Figure 1:
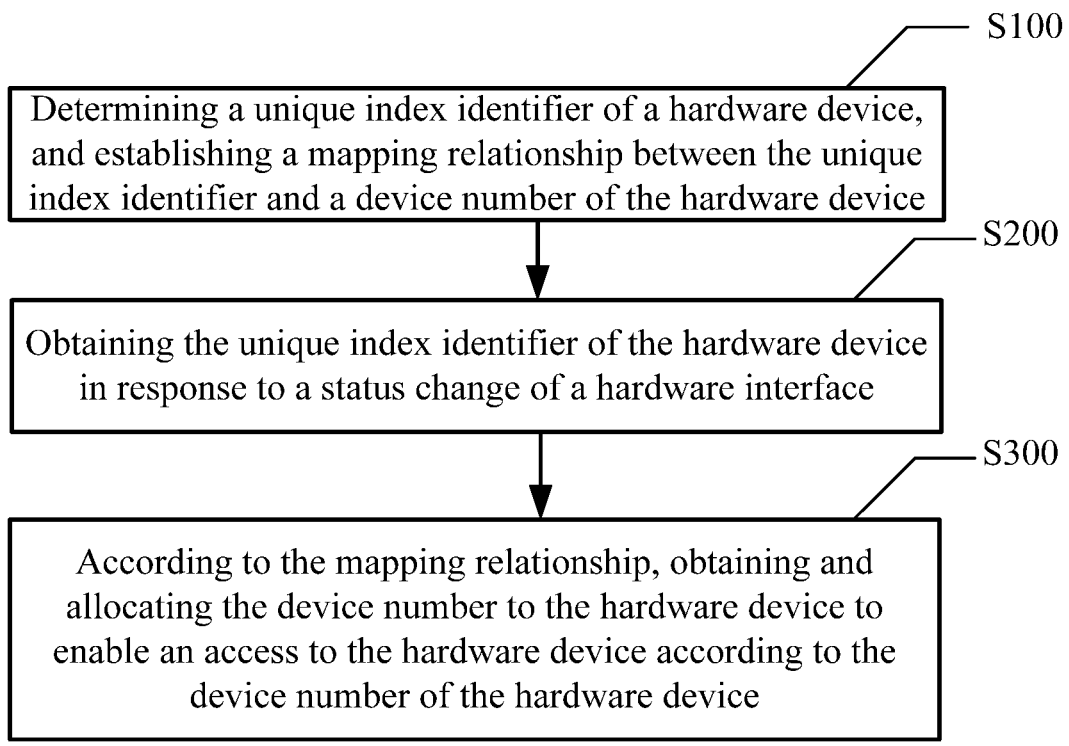
FIG. 1 illustrates a flow chart of a method for identifying a hardware device in an operating system consistent with various disclosed embodiments of the present disclosure.

The present disclosure provides a method for identifying a hardware device in an operating system and a computer apparatus. FIG. 1 illustrates a flow chart of a method for identifying a hardware device in an operating system consistent with various disclosed embodiments of the present disclosure. In the present disclosure, the operating system may be any operating system running on a computer apparatus, including a LINUX system, a WINDOWS system, a UNIX system, and an IOS system, etc. The computer apparatus may include a desktop computer, a laptop computer, and a server, etc. The computer apparatus may include at least one hardware interface, including an IDE interface, a SCSI interface, a SATA interface, a USB interface, and a PCI interface, etc. Different hardware devices may access to the computer apparatus through the above hardware interfaces. The hardware devices may include a hard disk, a monitor, a keyboard, a mouse, a microphone, and an electronic drawing board, etc.

As shown in FIG. 1, the method for identifying a hardware device in an operating system may include the following.

In S100: Determining a unique index identifier of a hardware device, and establishing a mapping relationship between the unique index identifier and a device number of the hardware device.

In some embodiments, a unique index identifier of a hardware device may be a globally unique identifier set by the manufacturer for the hardware device in response to manufacturing the hardware device.

A hard disk is used as an example, a unique index identifier of the hard disk may be a universally unique identifier (UUID) of the hard disk. After determining the UUID of the hard disk, a mapping relationship between the UUID and the device number may be established. For example, the UUID of a hard disk may be '51251435-2847-3FA4-B4CA-517B3242543B', a mapping relationship between '51251435-2847-3FA4-B4CA-517B3242543B' and 'SDA' may be established in response to naming the hard disk in the operating system as 'SDA'.

For a plurality of hardware devices connected to a same computer apparatus, a plurality of mapping relationships of the plurality of hardware devices may be set in batches, as shown in Table 1.

TABLE 1

| Hardware device | Unique index identifier | Device number |
|---|---|---|
| Hard disk | 51251435-2847-3FA4-B4CA-517B3242543 | SDA |
| Keyboard | 587924867719586543 | Keyboard |
| Mouse | 623413012245158366 | Mouse |
| . . . | . . . | . . . |

In some embodiments, a location attribute parameter of a hardware device may be used as a unique index identifier of the hardware device to uniquely identify the hardware device in response to the hardware interface used by the hardware device not being changed. The hardware device is a static disk among disks as an example to describe the implementation manner. The disk is an indispensable device in a computer system, such as a small computer system interface (SCSI) disk. The SCSI disk may be a disk that uses a SCSI interface. The disk may be used to store a wide variety of data, such as document data, audio data, video data, and image data, etc.

In some embodiments, the disk may be divided into two types: static disk and dynamic disk. The static disk may refer to a disk that does not change or does not change frequently after being loaded, and a used disk interface may not change in response to the disk even being changed. The dynamic disk may refer to a disk that often changes after being loaded, such as a U disk.

Since the static disk has static attribute, in other words, since the static disk has a static location attribute parameter, the location attribute parameter of the static disk may be used as the unique index identifier of the static disk. The location attribute parameter of the static disk may include a disk controller number, a disk cage number, and one of a backplane slot number and a physical layer transceiver number.

The disk controller may control a plurality of disk cages, one disk cage may include a plurality of backplane slots, and each backplane slot may be for one disk to access. In addition, the physical layer transceiver number may have a correspondence relationship with the disk. Thus, the location of a disk may be uniquely determined by the above three groups of parameters. For the static disk having static attribute, the location attribute parameter of the static disk may uniquely identify the static disk.

After determining the location attribute parameter of the hardware device, the correspondence relationship between the location attribute parameter of the hardware device and the device number may be established. The hardware device is a static disk as an example. In the present disclosure, by providing a logical index domain (LID), and partitioning the logical index domain into a dynamic index domain (dynamic LID) and a static index domain (static LID), a corresponding number provided in the static index domain may be used to establish the correspondence relationship between the location attribute parameter of the static disk and the disk number.

In the present disclosure, the computer system is a Linux system as an example. In the LINUX system, the correspondence relationship between the location attribute parameter of a static disk and a disk number may be established by using a LINUX kernel. Configuration information of the logical index domain may need to be first obtained in response to establishing the correspondence relationship. The configuration information may include configuration information of the dynamic index domain and configuration information of the static index domain in the logical index domain. The configuration information may refer to which segments in the logical index domain belong to the dynamic index domain and which segments belong to the static index domain. The index domain may refer to a plurality of numbers or symbols for numbering the disk.

In some embodiments, a configuration page may be provided by a baseboard management controller (BMC). One or more segments of the static index domain may be provided in the configuration page for the logical index domain, while others in the logical index domain may be the dynamic index domain. The BMC may generate the configuration information, and transmit the configuration information to the LINUX kernel through an intelligent platform management interface (IPMI) command. The configuration information may be generated by the BMC through providing one or more segments of the static index domain in the logical index domain. In response to the configuration information in the BMC being changed, the LINUX kernel may receive the changed configuration information sent by the BMC, and may update the configuration information, according to the changed configuration information.

Figure 2:
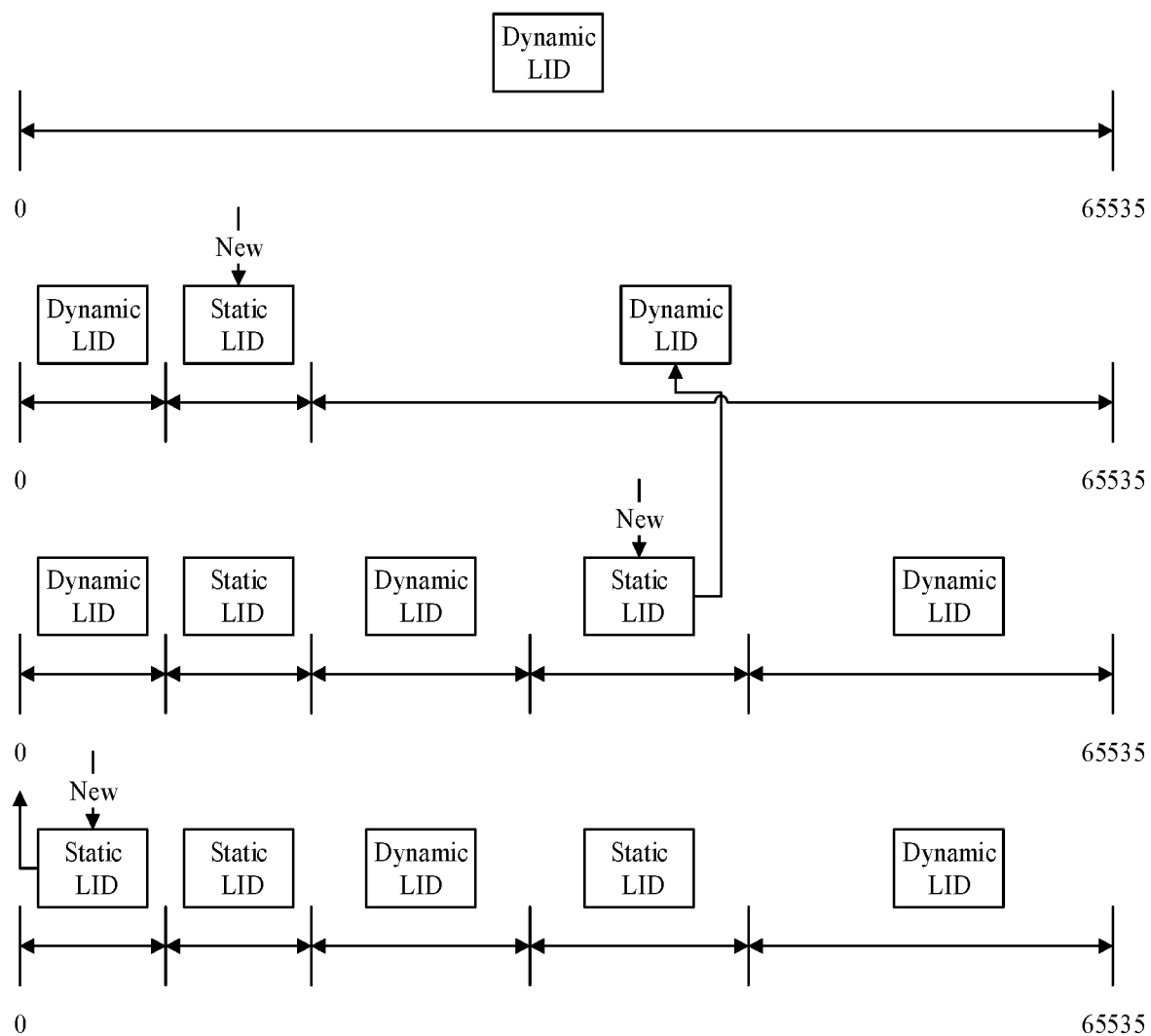
FIG. 2 illustrates a structural diagram of a logical index domain consistent with various disclosed embodiments of the present disclosure.

After obtaining the configuration information of the logical index domain, which segment of the logical index domain belongs to the dynamic index domain and which segment belongs to the static index domain may be found according to the configuration information, and the logical index domain may be further divided according to the configuration information. As shown in FIG. 2, the logical index domain in the LINUX kernel may be divided into two kinds of domains: the dynamic index domain and the static index domain. Referring to FIG. 2, initially, the entire domain with logic numbers from 0 to 65535 may be dynamic LID. After a first insert operation, a segment of the static LID may appear. Similarly, after two more insert operations, three segments of the static LID may ultimately appear. The segments of the dynamic LID may be sandwiched between the three segments of the static LID, and thus the logical index domain may be divided into three segments of the static LID and two segments of the dynamic LID as shown in FIG. 2.

To establish the correspondence relationship between the location attribute parameter of the static disk and the disk number using the corresponding number provided in the static index domain, in some embodiments, conversion rule between the location attribute parameter of the static disk and the location attribute parameter of the static index domain may be preset. The conversion rule may describe the correspondence relationship between the location attribute parameter of static disk and the static index domain.

The location attribute parameter of the static disk may be a three-dimensional number, including the disk controller number, the disk cage number, and one of the backplane slot number and the physical layer transceiver number. The location attribute parameter of the static index domain may be a one-dimensional number. Therefore, according to the preset conversion rule, the three-dimensional numbering manner of the location attribute parameter of the static disk may be converted into the corresponding one-dimensional numbering manner of the location attribute parameter of the static index domain.

On the basis of converting the location attribute parameter of the static disk into the location attribute parameter of the static index domain, according to the converted location attribute parameter of the static index domain, the static index domain corresponding to the static disk may be found from the logical index domain. Then, a number that is not occupied (not occupied by other hardware devices) may be selected for the static disk from the founded static index domain. The selected number may be used as the disk number of the static disk to establish the mapping relationship between the location attribute parameter of the static disk and the disk number. In practical applications, according to the above process, a plurality of mapping relationships between static disks and disk numbers may be established in batches.

In some embodiments, establishing the mapping relationship between the unique index identifier and the device number of the hardware device may include setting the above mapping relationship in the BIOS interface according to specific rules.

For example, in a case where the unique index identifier of a hardware device is the globally unique identifier of the hardware device, the device numbers corresponding to a plurality of hard disks may be set as "SDA, SDB, SDC, . . . ". The device number corresponding to the keyboard may be set as "KeyBoard", and the device number corresponding to the mouse may be set as "Mouse". Through such rules, the device type may be easily identified by the corresponding English name in the operating system. In addition, the system may automatically generate the above mapping relationship. For example, the system may automatically create a name list that includes a plurality of device numbers corresponding to unique index identifiers of the respective hardware devices. In a case where the unique index identifier of the hardware device is the location attribute parameter of the hardware device, the hardware device is a static disk as an example, the specific rule may be the above-described rule of converting the location attribute parameter of the static disk into the location attribute parameter of the static index domain, finding the corresponding static index domain from the logical index domain based on the location attribute parameter of the static index domain, and selecting the corresponding number from the founded static index domain as the disk number. Through such rule, the mapping relationship between the location attribute parameter of a hardware device, such as a static disk, and the disk number may be established in the BIOS interface.

Establishing the mapping relationship between the unique index identifier and the device number of the corresponding hardware device may also include creating a linked list, where each node of the linked list may represent a group of a mapping relationship between a unique index identifier and the device number of the corresponding hardware device. For example, in a LINUX system, a variable "block_dev_map" linked list may be established in "Memory type EFI_ACPI_MEMORY_NVS":

```
Struct block_dev_map {
Char * uuid;
Int num;
Struct block_dev_map * next;
}
```

In the above linked list, "*uuid" may be a string-type variable pointer, and may represent a unique index identifier of the hardware device. "Num" may be an integer-type variable, and may represent the device number of the hardware device. The pointer "*next" may point to the next node.

In addition, besides establishing the mapping relationship by creating the linked list, an index variable may be established to describe the mapping relationship between the unique index identifier and the device number of the corresponding hardware device. For example, as each hardware device accesses to a computer apparatus through a UEFI interface, a UEFI interface variable may be created in the LINUX system. One UEFI interface variable may indicate one group of mapping relationship between a unique index identifier and a device number. In the LINUX system, since the UEFI interface variable can be accessed and modified by both the BIOS and the operating system, the UEFI interface variable may transmit the mapping relationship between the BIOS and the operating system.

In S200: Obtaining the unique index identifier of the hardware device in response to the status change of the hardware interface.

The status of the hardware interface may change in various situations, for example, the interface is powered on triggered by an access to the hardware device, the interface is powered off triggered by unplugging the hardware device, and the interface power supply status changes triggered by hot-swapping the hardware device. In the LINUX system, the status change of the hardware interface may be determined by a "_DSM" method. In addition, the "_DSM" method may transmit the device access situation on each interface to the operating system in response to the computer apparatus being started.

In S300: According to the mapping relationship, obtaining and allocating the device number to the hardware device to enable an access to the hardware device according to the device number of the hardware device.

In the above process, the operating system may read out the node data in the linked list or variable data through a specific function, to obtain the above unique index identifier. For example, in the LINUX system, the UEFI interface variable or the linked list may be read through a "sd_probe" function to obtain the corresponding mapping relationship.

The LINUX system may modify a "sd.c" file through the "sd_probe" function in response to allocating the device number to the corresponding hardware device, such that the correspondence relationship between a physical address of the hardware interface in the "sd.c" file and the logical address may be modified into the mapping relationship between the physical address of the hardware interface and the device number. The "sd.c" file may be a drive upper address mapping file in the SCSI unit, and may record the correspondence relationship between the physical address of the hardware interface and the logical address. The operating system may need to call the "sd.c" file in response to accessing the hardware device to get the corresponding physical address according to the logical address, and thus may access to the correct hardware device. Since the logical address in the "sd.c" file is replaced by the device number, an access to the hardware device may be achieved based on the device number. In addition, in the present disclosure, the driver of the hardware device may not need to be modified, and the unique naming of the hardware device may be achieved by modifying the drive upper address mapping file.

Accordingly, in the present disclosure, by establishing a mapping relationship between the unique index identifier of the hardware device and the locally-defined device number, the operating system may obtain the corresponding device number according to the unique index identifier of the hardware device, and may uniquely identify the corresponding hardware device according to the device number in response to the access to the hardware device. For example, to execute a script program in the operating system, an instruction in the script program may refer to "read the data of the first byte in SDA", where "SDA" may refer to the hard disk A. In the prior art, when the hard disk A is hot-swapped or so, because the first currently available device number in the system is "SDB", the system allocates "SDB" to the hard disk A, such that "SDA" in the script program can no longer continue to refer to the hard disk A, and "SDA" in the script program may need to be manually changed to "SDB". In the present disclosure, since the mapping relationship between the UUID of the hard disk A and "SDA" is established, in response to the hard disk A being hot-swapped or so, the operating system may still obtain the corresponding "SDA" according to the UUID of the hard disk A and allocate "SDA" to the hard disk A, such that "SDA" in the script program can continue to refer to the hard disk A.

Figure 3:
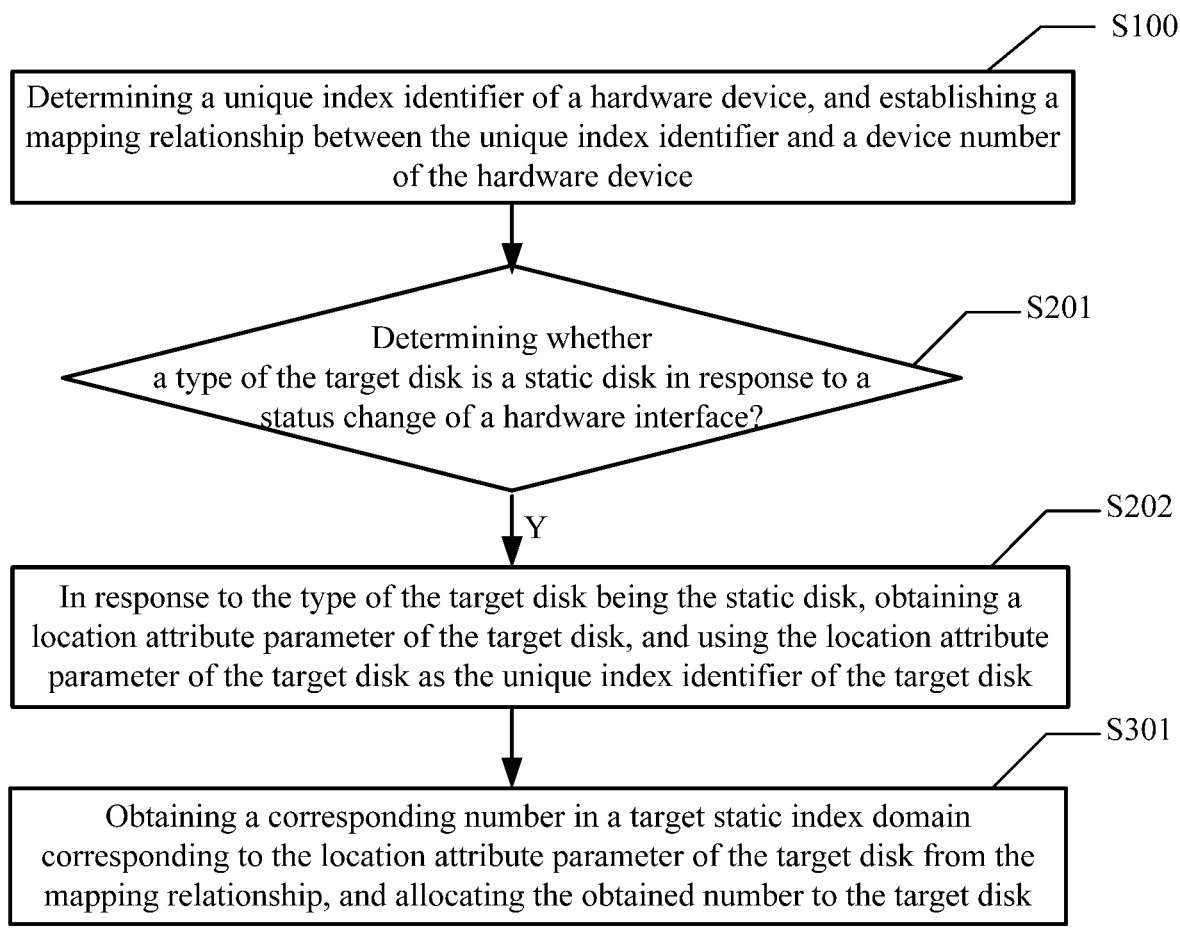
FIG. 3 illustrates a flow chart of another method for identifying a hardware device in an operating system consistent with various disclosed embodiments of the present disclosure.

FIG. 3 illustrates a flowchart of another method for identifying a hardware device in an operating system consistent with various disclosed embodiments of the present disclosure. In some embodiments, the hardware device may be a target disk. Referring to FIG. 3, obtaining the unique index identifier of the hardware device in S200 may be realized through the following.

In S201: Determining whether a type of the target disk is a static disk. In some embodiments, for the static disk, a static numbering manner may be used. In other words, the static disk may use a manner based on the preset mapping relationship provided in the present disclosure for determining a disk number and allocating the number. The dynamic disk may still use a dynamic numbering manner based on preemption principles. Therefore, for the target disk, whether the type of the target disk is a static disk may need to be first determined in response to allocating the number.

In S202: In response to the type of the target disk being a static disk, obtaining a location attribute parameter of the target disk, and using the location attribute parameter of the target disk as a unique index identifier of the target disk.

As the determination result indicates that the type of the target disk is a static disk, since the static disk has a static attribute, in other words, since the static disk has a static location attribute parameter, the location attribute parameter of the target disk may be referred to the unique index identifier of the target disk.

Obtaining the location attribute parameter of the target disk may include obtaining the following parameters of the target disk: a disk controller number, a disk cage number, and one of a backplane slot number and a physical layer transceiver number. The location of a static disk may be uniquely determined by the above three groups of parameters. Correspondingly, the location attribute parameter of a static disk may uniquely identify the static disk.

Correspondingly, referring to FIG. 3, according to the mapping relationship, obtaining and allocating the device number to the hardware device in S300 may be realized through the following.

In S301: Obtaining a corresponding number in a target static index domain corresponding to the location attribute parameter of the target disk from the mapping relationship, and allocating the obtained number to the target disk.

The mapping relationship may include a correspondence relationship between the location attribute parameter of the static disk and a corresponding number in the corresponding static index domain. The target static index domain may be a static index domain indicated by the location attribute parameter of the static index domain corresponding to the location attribute parameter of the target disk in the logical index domain. The logical index domain may include the dynamic index domain and the static index domain that are determined according to the obtained configuration information of the logical index domain.

Therefore, on the basis of the obtained location attribute parameter of the target disk, according to the location attribute parameter of the target disk, a corresponding number in the target static index domain corresponding to the location attribute parameter of the target disk may be found from the correspondence relationship between the location attribute parameter of the static disk and the corresponding number in the corresponding static index domain, and the obtained corresponding number may be allocated to the target disk.

In some embodiments, for a static disk, a number may be selected from the corresponding static index domain and may be fixed, and the numbering manner may be a static manner. The number may not change with the order in which the hardware device is loaded, the scanning order of a peripheral component interconnect (PCI) bus, the order in which the hardware device controller is hot-swapped, or the order in which the hardware device is hot-swapped, etc., to avoid the occurrence of misplacing disk sort, etc.

Figure 4:
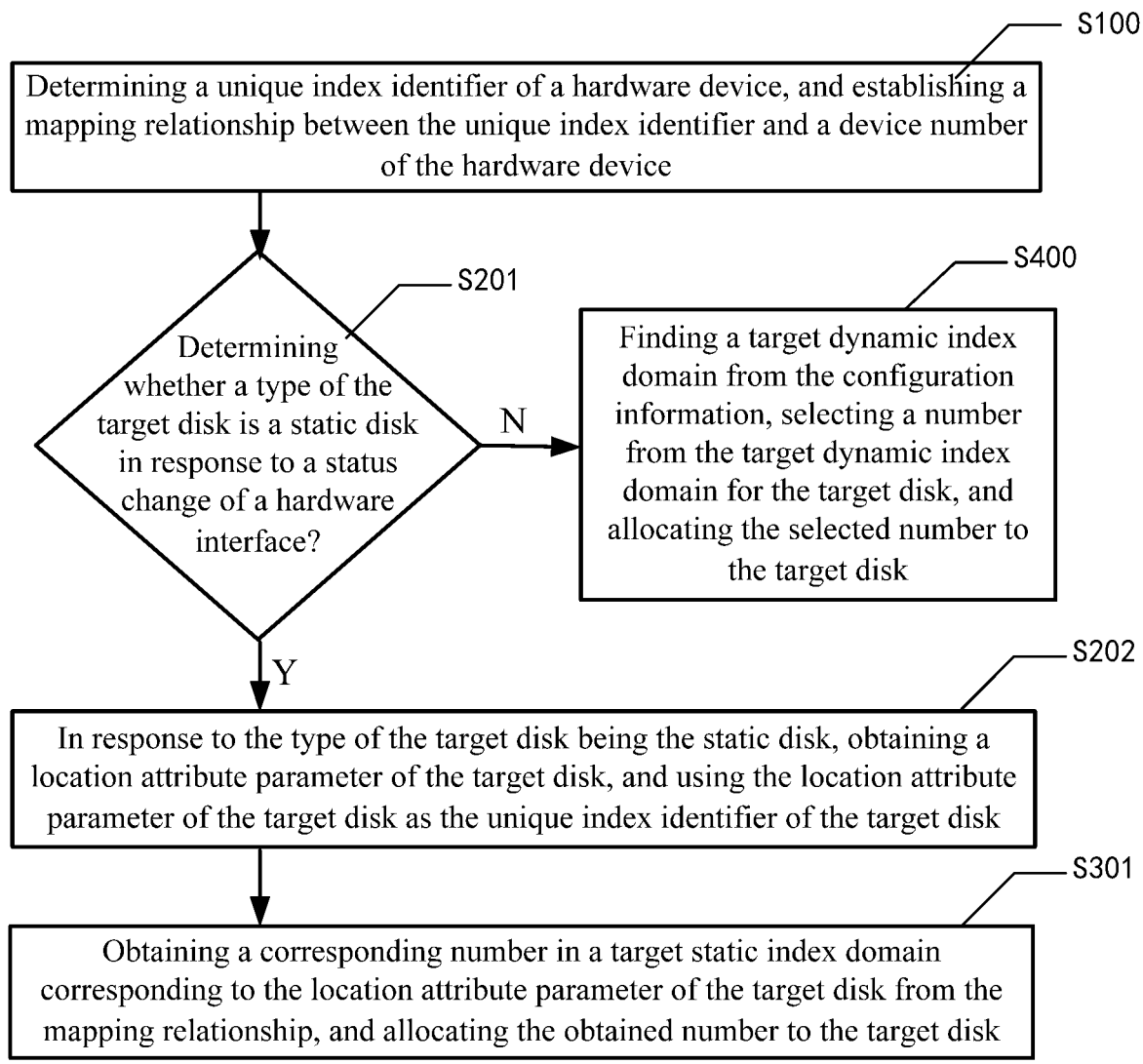
FIG. 4 illustrates a flow chart of another method for identifying a hardware device in an operating system consistent with various disclosed embodiments of the present disclosure.

FIG. 4 illustrates a flowchart of another method for identifying a hardware device in an operating system consistent with various disclosed embodiments of the present disclosure. The same or similar features of FIG. 4 and FIG. 3 are not repeated herein. The difference may include that FIG. 4 further includes the following.

In S400: As the type of the target disk is a dynamic disk, finding a target dynamic index domain from the configuration information, selecting a number from the target dynamic index domain for the target disk, and allocating the selected number to the target disk.

In some embodiments, for a dynamic disk, the LINUX kernel may still numbering the disk through the dynamic allocation plan based on preemption principles. After the disk controller registers a new disk with the LINUX kernel, the LINUX kernel may always search for an available number from the dynamic index domain in the logical index domain starting from the number zero.

Figure 5:
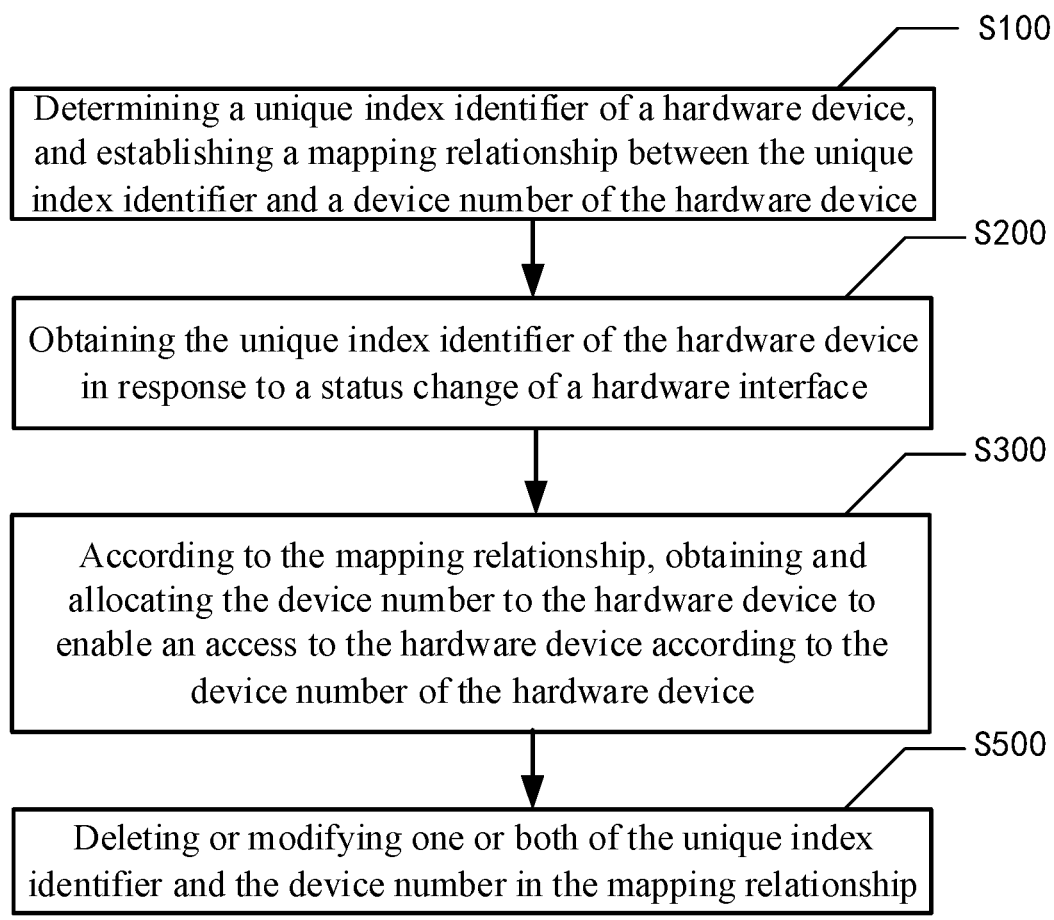
FIG. 5 illustrates a flow chart of another method for identifying a hardware device in an operating system consistent with various disclosed embodiments of the present disclosure.

FIG. 5 illustrates a flowchart of another method for identifying a hardware device in an operating system consistent with various disclosed embodiments of the present disclosure. The same or similar features of FIG. 5 and FIG. 1 are not repeated herein. The difference may include that FIG. 5 further includes the following.

In S500: Deleting or modifying one or both of the unique index identifier and the device number in the mapping relationship.

Referring to the embodiments in FIG. 1, the operating system may access the mapping relationship between the unique index identifier and the device number by acquiring the linked list or the interface variable. In the embodiments in FIG. 5, after a new hardware device accesses, the old hardware device is deleted, the old hardware device is replaced, and the device number of the hardware device is modified, the operating system may further modify the mapping relationship. For example, in response to an access to a new hardware device, a node may be added in the linked list or a new interface variable may be established to record the mapping relationship between the unique index identifier of the new hardware device and the device number. In response to deleting the old hardware device, the corresponding node in the linked list may be deleted or the corresponding interface variable may be deleted, such that the corresponding unique index identifier and the corresponding device number may be deleted together. In response to replacing the old hardware device, the device number in the mapping relationship may be kept unchanged and the unique index identifier may be modified. In response to changing the device number of the hardware device, the unique index identifier in the mapping relationship may be kept unchanged and the device number may be modified. Through the above method, the mapping relationship may be modified in any way at the application layer of the operating system, such that it is more flexible to add, delete and replace the hardware devices.

Figure 6:
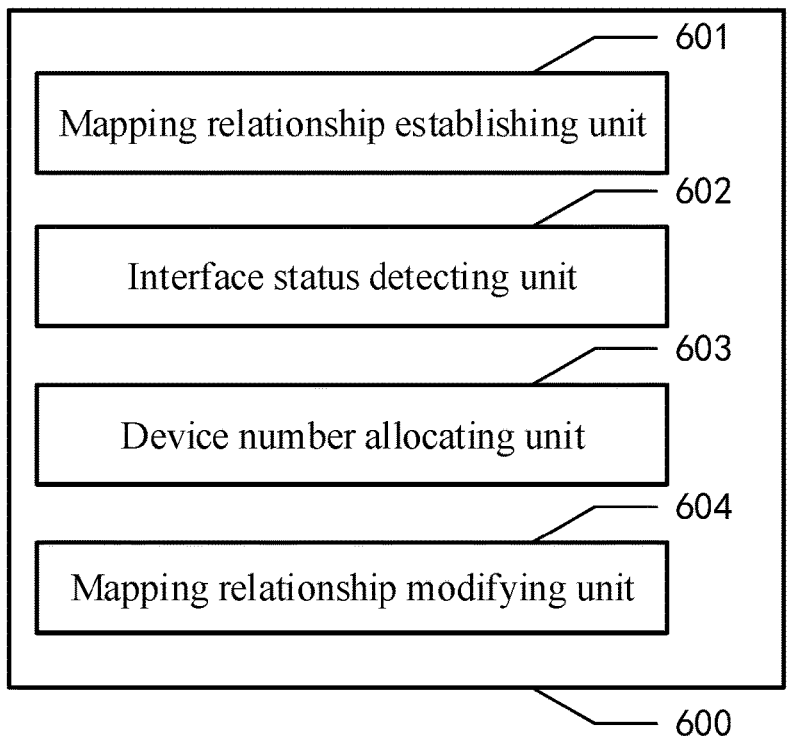
FIG. 6 illustrates a structural diagram of a system for identifying a hardware device in an operating system consistent with various disclosed embodiments of the present disclosure.

FIG. 6 illustrates a structural diagram of a system for identifying a hardware device in an operating system consistent with various disclosed embodiments of the present disclosure. Referring to FIG. 6, the disclosed system 600 for identifying a hardware device may include a mapping relationship establishing unit 601, an interface status detecting unit 602, a device number allocating unit 603, and a mapping relationship modifying unit 604. The system 600 may execute the methods in FIG. 1 and FIGS. 3-5 to identify hardware devices in an operating system.

In some embodiments, the mapping relationship establishing unit 601 may first determine the unique index identifier of the hardware device, and establish the mapping relationship between the unique index identifier and the device number of the hardware device. The established mapping relationship may be stored in a mapping relationship storing unit. The interface status detecting unit 602 may constantly detect the status of the hardware interface. In response to detecting the status of the hardware interface being changed, the interface status detecting unit 602 may directly obtain the unique index identifier of the hardware device from the hardware device, and transmit the unique index identifier to the device number allocating unit 603. After acquiring the unique index identifier sent by the interface status detecting unit 602, the device number allocating unit 603 may obtain the mapping relationship from the mapping relationship storing unit, acquire the corresponding device number from the mapping relationship according to the unique index identifier, and allocate the device number to the corresponding hardware device, such that an access to the corresponding hardware device may be achieved according to the device number of the hardware device. In the subsequent maintenance, the mapping relationship modifying unit 604 may delete or modify one or both of the unique index identifier and the device number in the mapping relationship stored in the mapping relationship storing unit.

Figure 7:
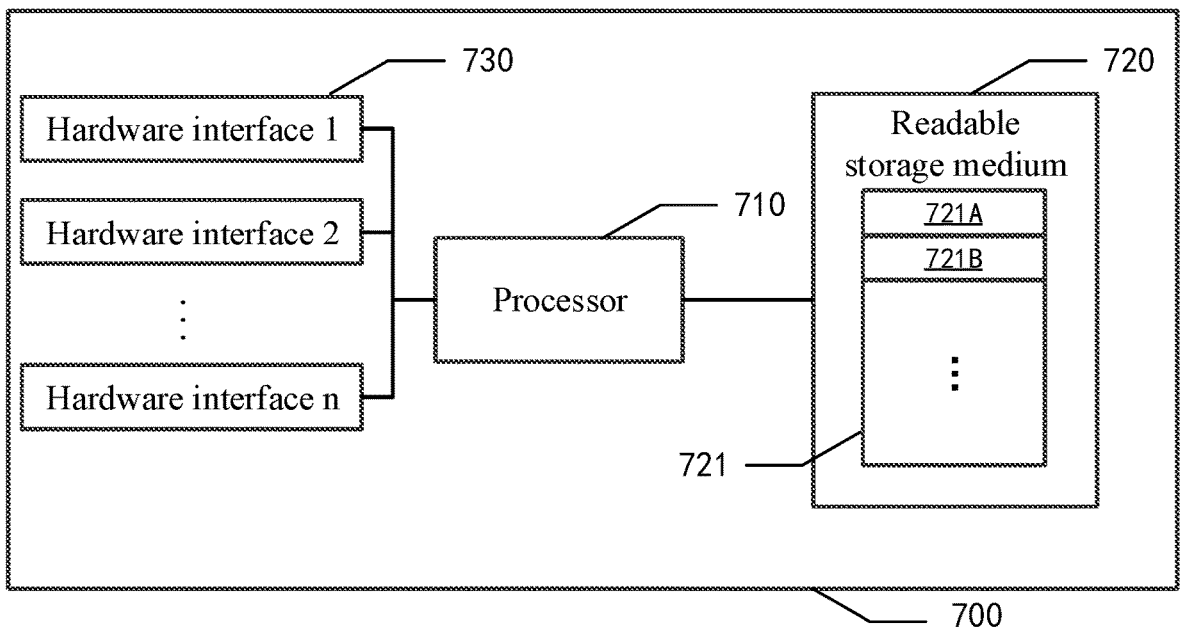
FIG. 7 illustrates a structural diagram of a computer apparatus consistent with various disclosed embodiments of the present disclosure.

FIG. 7 illustrates a structural diagram of a computer apparatus consistent with various disclosed embodiments of the present disclosure. Referring to FIG. 7, the computer apparatus 700 may include a processor 710, a memory 720, and a plurality of hardware interfaces 730. The computer apparatus 700 may execute the methods in FIG. 1 and FIGS. 3-5 to identify the hardware devices in an operating system.

In some embodiments, the processor 710 may include a general purpose microprocessor, an instruction set processor and/or associated chipsets, and/or a special purpose microprocessor (e.g., an application specific integrated circuit (ASIC)), etc. The processor 710 may also include an on-board memory for caching purpose. The processor 710 may be a single processing unit or multiple processing units for executing different actions of the disclosed methods in FIG. 1 and FIGS. 3-5.

The computer-readable storage medium 720 may be any medium that can contain, store, communicate, propagate, or transmit the instructions. For example, the readable storage medium may include but is not limited to electrical, magnetic, optical, electromagnetic, infrared, or semiconducting system, apparatus, device, or propagating medium. In some embodiments, the readable storage medium may include a magnetic storage device, such as a magnetic tape or a hard disk (HDD); an optical storage device, such as a compact disk (CD-ROM); a memory, such as a random access memory (RAM) or a flash memory; and/or wire/wireless communication link.

The computer-readable storage medium 720 may include a computer program 721. The computer program 721 may include codes/computer-executable instructions, such that the processor 710 may execute the above disclosed methods and any variations thereof in FIG. 1 and FIGS. 3-5 to execute the computer program 721.

In some embodiments, the computer program 721 may be configured with computer program code including a computer program unit. For example, in some embodiments, the code in the computer program 721 may include one or more program units including a unit 721A, a unit 721B, . . . . The division manner and the number of the units are not fixed, and those skilled in the art may use suitable program units or a combination of program units according to actual conditions. The processor 710 may execute the above disclosed methods and any variations thereof in FIG. 1 and FIGS. 3-5 to execute the combination of program units.

The present disclosure provides a method for identifying a hardware device in an operating system and a computer apparatus using the method. The method may include determining a unique index identifier of a hardware device, and establishing a mapping relationship between the unique index identifier and a device number of the hardware device. The method may also include obtaining the unique index identifier of the hardware device in response to the status change of the hardware interface. Further, the method may include according to the mapping relationship, obtaining and allocating the device number to the hardware device to enable an access to the hardware device according to the device number of the hardware device. Based on the above method, an access to the hardware device may be achieved by a same device number in response to the same hardware device accessing to any hardware interface at any moment.

The method, apparatus, components and units in various embodiments of the present disclosure may be realized through a computing-capable electronic device that executes software containing computer instructions. The system may include a storage device to realize the various types of storage described above. The computing-capable electronic device may include but is not limited to a device capable of executing computer instructions, such as a general purpose processor, a digital signal processor, a dedicated processor, and a reconfigurable processor, etc. Execution of such instructions may cause the electronic device to be configured to perform the above-disclosed respective operations. The above devices and/or units may be realized in one electronic device or in different electronic devices. The software may be stored in the computer-readable storage medium. The computer-readable storage medium may store one or more programs (software units). The one or more programs may include instructions that enable the electronic device to perform the disclosed methods in the present disclosure in response to executing the instructions by one or more processors in the electronic device.

In some embodiments, the software may be stored in a form of volatile memory or non-volatile memory device, such as a memory device like ROM, no matter whether it is erasable or rewritable. In another embodiment, the software may be stored in a form of memory (e.g., RAM, memory chip, device, or integrated circuit). In certain embodiments, the software may be stored in an optically readable medium or a magnetically readable medium, such as a CD, a DVD, a magnetic disk, or a magnetic tape, etc. The memory device and the memory medium are examples of machine-readable memory devices that are suitable for storing one or more programs. The one or more programs may include instructions that enable implementation of disclosed embodiments in response to being executed. The present disclosure provides the program and a machine-readable memory device that stores the program. The program may include codes of the apparatus or method for implementing any one of the claims in the present disclosure. In addition, the program may be electronically transmitted via any medium, such as communication signal carried over a wire connection or a wireless connection, and may be appropriately included in various embodiments of the present disclosure.

In some embodiments, the disclosed method, apparatus, components and/or units may be realized through a hardware or firmware that uses any suitable way for integrating or packaging the circuit, such as a field-programmable gate array (FPGA), a programmable logic array (PLA), a system on a chip, a system on a substrate, a system on package, or an application specific integrated circuit (ASIC), etc. In another embodiment, the disclosed method, apparatus, components and/or units may be realized through an appropriate combination of three implementations including software, hardware and firmware. The system may include a storage device to realize the storage described above. In response to being implemented by these ways, the used software, hardware and/or firmware may be programmed or designed to perform the disclosed above corresponding methods, and/or functions. Those skilled in the art may appropriately implement one or more of the systems and components, or one or more parts of the systems and components, using different above implementations according to actual needs. All of these implementations fall within the scope of the present disclosure.

In some embodiments, a non-transitory computer-readable storage medium including instructions, such as a memory including instructions executable by a processor to realize the above method, may be provided. For example, the non-transitory computer-readable storage medium may be a ROM, a random access memory (RAM), a CD-ROM, a magnetic tape, a floppy disk, and an optical data storage device, etc.

As will be understood by those skilled in the art, all ranges disclosed in the present disclosure also cover any and all possible sub-ranges, as well as a combination of sub-ranges thereof, for any and all purposes, such as providing written instructions. Any listed range can be easily recognized as sufficiently describing and enable the same range to be broken down, at least, into two equal parts, three equal parts, four equal parts, five equal parts, ten equal parts, and so on. As a non-limiting example, each of the ranges discussed in the present disclosure can be easily broken down into the lower third, the middle third, the upper third, and so on. As will also be understood by those skilled in the art, the terms such as "up to," "at least," "greater than," and "less than," etc., include the stated quantities and refer to ranges that can be subsequently broken down into sub-ranges as discussed above. Further, as will be understood by those skilled in the art, the ranges include the individual components. For example, a group having 1-3 units refers to a group having 1, 2, or 3 units. Similarly, a group having 1-5 units refers to a group having 1, 2, 3, 4 or 5 units, etc.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for identifying a hardware device in an operating system, comprising:
    determining a unique index identifier of a hardware device, the hardware device being a target disk, and establishing a mapping relationship between the unique index identifier and a device number of the hardware device;
    in response to a status change of a hardware interface, obtaining the unique index identifier of the hardware device including:
        determining whether a type of the target disk is a static disk, and
        in response to the type of the target disk being the static disk, obtaining a location attribute parameter of the target disk, and using the location attribute parameter of the target disk as the unique index identifier of the target disk; and
    according to the mapping relationship, obtaining and allocating the device number to the hardware device to enable an access to the hardware device according to the device number of the hardware device, including:
    obtaining a corresponding number in a target static index domain corresponding to the location attribute parameter of the target disk from the mapping relationship, and allocating the obtained number to the target disk, wherein:
    the mapping relationship includes a correspondence relationship between the location attribute parameter of the static disk and the corresponding number in a corresponding static index domain,
    the target static index domain is a static index domain indicated by a location attribute parameter of the static index domain corresponding to the location attribute parameter of the target disk in a logical index domain, and
    the logical index domain includes a dynamic index domain and the static index domain that are determined according to obtained configuration information of the logical index domain.

2. The method according to claim 1, wherein obtaining the configuration information of the logical index domain includes:
    obtaining the configuration information of the logical index domain from a baseboard management controller, wherein the configuration information is generated by the baseboard management controller by providing one or more segments of the static index domain in the logical index domain;
    receiving changed configuration information sent by the baseboard management controller in response to the configuration information in the baseboard management controller being changed; and
    updating the configuration information according to the changed configuration information.

3. The method according to claim 1, further including:
    as the type of the target disk is a dynamic disk, finding a target dynamic index domain from the configuration information, selecting a number from the target dynamic index domain for the target disk, and allocating the selected number to the target disk.

4. The method according to claim 1, wherein obtaining the location attribute parameter of the target disk includes:
    obtaining following parameters of the target disk: a disk controller number, a disk cage number, and one of a backplane slot number and a physical layer transceiver number.

5. The method according to claim 1, wherein establishing the mapping relationship between the unique index identifier and the device number of the hardware device includes:
    setting the mapping relationship in a basic input/output system interface according to specific rules, or
    automatically generating the mapping relationship; and
    creating a linked list, wherein each node of the linked list represents a group of the mapping relationship between the unique index identifier and the device number of the corresponding hardware device, or
    establishing an index variable, to describe the mapping relationship between the unique index identifier and the device number of the corresponding hardware device.

6. The method according to claim 1, further including:
    deleting or modifying one or both of the unique index identifier and the device number in the mapping relationship.

7. A computer apparatus, comprising:
    a hardware interface; a memory; and a processor, coupled with the hardware interface and the memory,
    wherein:
    the hardware interface provides an access for a hardware device, the hardware device being a target disk,
    the memory stores computer-readable instructions,
    to execute the computer-readable instructions, through an operating system, the processor:
        determines a unique index identifier of the hardware device, and establishes a mapping relationship between the unique index identifier and a device number of the hardware device;
        in response to a status change of a hardware interface, obtains the unique index identifier of the hardware device, including:
            determining whether a type of the target disk is a static disk, and
            in response to the type of the target disk being the static disk, obtaining a location attribute parameter of the target disk, and using the location attribute parameter of the target disk as the unique index identifier of the target disk; and
        according to the mapping relationship, obtains and allocates the device number to the hardware device to enable an access to the hardware device according to the device number of the hardware device, including:
            obtaining a corresponding number in a target static index domain corresponding to the location attribute parameter of the target disk from the mapping relationship, and allocating the obtained number to the target disk, wherein: the mapping relationship includes a correspondence relationship between the location attribute parameter of the static disk and the corresponding number in a corresponding static index domain, the target static index domain is a static index domain indicated by a location attribute parameter of the static index domain corresponding to the location attribute parameter of the target disk in a logical index domain, and the logical index domain includes a dynamic index domain and the static index domain that are determined according to obtained configuration information of the logical index domain.

8. The computer apparatus according to claim 7, wherein obtaining the configuration information of the logical index domain includes:

obtaining the configuration information of the logical index domain from a baseboard management controller, wherein the configuration information is generated by the baseboard management controller by providing one or more segments of the static index domain in the logical index domain;

receiving changed configuration information sent by the baseboard management controller in response to the configuration information in the baseboard management controller being changed; and updating the configuration information according to the changed configuration information.

9. The computer apparatus according to claim 7, wherein the processor:

as the type of the target disk is a dynamic disk, finds a target dynamic index domain from the configuration information, selects a number from the target dynamic index domain for the target disk, and allocates the selected number to the target disk.

10. The computer apparatus according to claim 7, wherein obtaining the location attribute parameter of the target disk includes:

obtaining following parameters of the target disk: a disk controller number, a disk cage number, and one of a backplane slot number and a physical layer transceiver number.

11. The computer apparatus according to claim 7, wherein establishing the mapping relationship between the unique index identifier and the device number of the hardware device includes:

setting the mapping relationship in a basic input/output system interface according to specific rules, or automatically generating the mapping relationship; and creating a linked list, wherein each node of the linked list represents a group of the mapping relationship between the unique index identifier and the device number of the corresponding hardware device, or establishing an index variable, to describe the mapping relationship between the unique index identifier and the device number of the corresponding hardware device.

12. The computer apparatus according to claim 7, wherein the processor:

deletes or modifies one or both of the unique index identifier and the device number in the mapping relationship.

* * * * *